(12) United States Patent  
Janakiraman et al.

(10) Patent No.: US 9,023,518 B2
(45) Date of Patent: May 5, 2015

(54) LITHIUM—SULFUR BATTERY WITH PERFORMANCE ENHANCED ADDITIVES

(75) Inventors: Umamaheswari Janakiraman, Webb City, MO (US); Ernest Ndzebet, Joplin, MO (US); Thillaiyan Ramanathan, Joplin, MO (US); Diana Marmorstein, Joplin, MO (US); Mario Destephen, Joplin, MO (US); Gregory Miller, Diamond, MO (US)

(73) Assignee: Eaglepicher Technologies, LLC, Joplin, MO (US)

( * ) Notice: Subject to any disclaimer, the term of this patent is extended or adjusted under 35 U.S.C. 154(b) by 27 days.

(21) Appl. No.: 13/617,858

(22) Filed: Sep. 14, 2012

(65) Prior Publication Data

US 2014/0079989 A1    Mar. 20, 2014

(51) Int. Cl.
*H01M 4/38* (2006.01)
*H01M 4/58* (2010.01)
*H01M 10/052* (2010.01)
*H01M 10/0567* (2010.01)

(52) U.S. Cl.
CPC ............... *H01M 4/38* (2013.01); *H01M 4/382* (2013.01); *H01M 4/5815* (2013.01); *H01M 10/052* (2013.01); *H01M 10/0567* (2013.01); *H01M 2300/0025* (2013.01); *Y02E 60/122* (2013.01)

(58) Field of Classification Search
CPC .......... H01M 10/052; H01M 10/0567; H01M 2300/0025; H01M 4/38; H01M 4/382; H01M 4/5815; Y02E 60/122
USPC ..................................................... 429/1–200
See application file for complete search history.

(56) References Cited

U.S. PATENT DOCUMENTS

| 4,833,048 | A | 5/1989 | Dejonghe et al. |
| 5,532,077 | A | 7/1996 | Chu |
| 6,017,651 | A * | 1/2000 | Nimon et al. .................. 429/101 |
| 6,025,094 | A | 2/2000 | Visco et al. |
| 6,110,236 | A * | 8/2000 | Tsang et al. ................. 29/623.5 |
| 6,506,524 | B1 * | 1/2003 | McMillan et al. ............ 429/324 |
| 7,045,242 | B2 * | 5/2006 | Nishiura et al. .............. 429/330 |
| 7,553,590 | B2 | 6/2009 | Mikhaylik |
| 8,057,859 | B2 | 11/2011 | Kaplan et al. |
| 2003/0139550 | A1 * | 7/2003 | Savu et al. ..................... 526/243 |
| 2005/0089759 | A1 | 4/2005 | Hwang et al. |
| 2005/0147891 | A1 | 7/2005 | Mikhaylik |

(Continued)

FOREIGN PATENT DOCUMENTS

EP         1 176 659 A2    1/2002

OTHER PUBLICATIONS

Ji et al., "A highly ordered nanostructured carbon—sulphur cathode for lithium—sulphur batteries," *Nature Materials*, vol. 8, pp. 500-506 (2009).

(Continued)

*Primary Examiner* — Milton I Cano
*Assistant Examiner* — Ling R Zeng
(74) *Attorney, Agent, or Firm* — Sutherland Asbill & Brennan LLP

(57) ABSTRACT

A battery includes an anode containing a lithium material, a cathode containing sulfur and a porous conducting medium, and an electrolyte, wherein the electrolyte contains an additive selected from the group consisting of an organic surfactant additive, an inorganic additive, and a mixture thereof. The organic surfactant additive may be a fluorosurfactant.

19 Claims, 16 Drawing Sheets

(56) References Cited

U.S. PATENT DOCUMENTS

2009/0042072 A1* 2/2009 Vu et al. .................. 429/21
2009/0286163 A1   11/2009 Shin et al.
2011/0052998 A1* 3/2011 Liang et al. .................. 429/300
2012/0070750 A1* 3/2012 Blanc et al. .................. 429/338

OTHER PUBLICATIONS

Aug. 12, 2013 European Search Report issued in European Application No. 13170322.5.

* cited by examiner

LITHIUM—SULFUR BATTERY WITH PERFORMANCE ENHANCED ADDITIVES

BACKGROUND

Lithium-sulfur batteries having extended cycle life and shelf life are disclosed. A fluorosurfactant may be incorporated into the non-aqueous electrolyte of a lithium-sulfur battery, optionally with lithium nitrate, lithium iodide, or both. When the fluorosurfactant, lithium nitrate, and lithium iodide are provided in combination in a non-aqueous electrolyte, cycle life and shelf life may be improved relative to an electrolyte without these additives.

As lighter, smaller portable electronic devices with increasing functionality are developed, there is generally a corresponding increasing demand for smaller, lighter batteries with increased energy density to power the devices. Such batteries can be used in commercial applications, such as portable notebooks and computers, digital and cellular phones, personal digital assistants, and the like, as well as in higher energy applications, such as hybrid and electric cars, and military or defense applications.

Lithium-sulfur batteries are very attractive rechargeable power sources for the above-mentioned applications, due to their high energy density and specific power. They are relatively light and can operate over a wide temperature range (about −50° C. to about 65° C.), use relatively inexpensive cathode materials (sulfur), and are relatively safe for the environment when compared to other battery technologies, such as nickel metal hydride (NiMH), lithium ion, nickel cadmium (Ni—Cd), and lead acid batteries. Despite these performance advantages, lithium sulfur batteries continue to suffer from low discharge-charge efficiency and poor cycle life due to polysulfides, soluble discharge products of sulfur. Moreover, the insulating nature of sulfur requires an unusually high content of electronic conducting additives, such as carbon, to improve overall cathode conductivity. The energy density of the cell can be reduced as a result.

Lithium sulfur batteries generally include a lithium anode, an electrolyte, a porous diffusion separator, and a sulfur cathode. Discharge of lithium sulfur battery proceeds in two steps. In the first step, sulfur is converted to polysulfides, $Li_2S_n$, where the order of n varies from 8 to 3. In the second step, these polysulfides are reduced to solid, $Li_2S_2$, and finally to $Li_2S$. The soluble polysulfide ($Li_2S_n$, 3<n<8) in the electrolyte may be deposited either on the anode or on the cathode as $Li_2S$. When $Li_2S$ is deposited on the cathode, it clogs the structural pores during multiple charge/discharge cycles. In addition there is also volume change due to the differences in the molar volumes of S and $Li_2S$, affecting the cathode morphology. This leads to a decrease in capacity with increasing cycle life. During charging, the $Li_2S$ from the cathode side is oxidized to higher polysulfides, which can migrate and are reduced to lower polysulfides by reacting on the anode. Thus the soluble polysulfides can shuttle between cathode and anode, causing overcharging and low Coulombic efficiency in lithium sulfur chemistry. In a discharge operation of the battery, lithium anode is oxidized to form lithium ions. During charging operation, the lithium ions are reduced to form lithium metal.

Unfortunately, with conventional lithium-sulfur batteries, the sulfur cathode discharge product, polysulfide, may dissolve in the electrolyte causing a loss of the active material and an increase in the electrolyte viscosity. Moreover, the dissolved species may migrate through the separator/electrolyte to react on the anode surface, causing further performance and capacity degradation.

Various attempts have been made to address these issues with conventional lithium-sulfur batteries. One approach is to confine sulfur discharge products within the cathode structure through the use of an organic or inorganic additive to chemically or physically bind it to the sulfur containing species, as shown in U.S. Pat. No. 4,833,048 and U.S. Pat. No. 5,532,077. Another example for the effort to confine the sulfur within the cathode structure is shown by Ji et al., which discloses a mesoporous carbon sulfur composite cathode with improved rate capability and cycle life for a lithium sulfur battery (Ji et al., Nature Materials, 8, 500 (2009)). Other approaches for addressing the above issues with conventional lithium-sulfur batteries, including anode protection against polysulfides, have been described in U.S. Pat. No. 6,025,094, U.S. Pat. No. 6,017,651, and U.S. Pat. No. 7,553,590.

Unfortunately, none of the described approaches have been completely successful in improving lithium sulfur battery performance compared to that of conventional lithium ion batteries, which used lithium transition metal oxides or phosphate as cathode active materials. Confining the sulfur containing species into the cathode by binding the species to an additive can decrease the amount of active material available for further electrochemical reactions. Moreover, modified electrolyte solutions fail to completely control the sulfur containing species' solubility, and a protective lithium anode layer might result in other undesirable effects on the electrochemical characteristics of the battery. The protective lithium anode layer is preferably conically conducting; however, this may prevent the continuous electron transfer from lithium to polysulfides in solution during discharge. The chemical nature of the additives or compounds that form the layer on lithium anode is critical to efficiently protect the lithium against polysulfides during cell rest.

However, despite the various attempts that have been proposed to improve Li-sulfur battery performance, there is still a need to develop effective approaches that both protect the anode against polysulfides and reduce sulfur self-discharge.

SUMMARY

A fluorosurfactant alone, or a fluorosurfactant in combination with lithium salts, may be added into the electrolyte of lithium-sulfur battery. Alternatively, these additives may be incorporated into a cathode during processing. When the additives are incorporated into a cathode, they may diffuse out from the cathode when the cathode contacts the electrolyte in the cell. The ways in which batteries containing these additives may address the drawbacks of conventional batteries will be discussed in greater detail below. In general, batteries containing a fluorosurfactant or a fluorosurfactant in combination with lithium salts may exhibit improved performance, including shelf life and charge-discharge efficiency, compared to traditional lithium-sulfur batteries. Moreover, the batteries are relatively safe and affordable in comparison to other battery technologies.

In accordance with various embodiments of the invention, a battery may include an anode containing lithium, a cathode containing sulfur and a porous conducting medium, and an electrolyte. As explained in greater detail below, the electrolyte may improve the performance of the battery by protecting the lithium anode against sulfur-containing reduction products, such as polysulfides. Additionally, the electrolyte may decrease the self-discharge of the sulfur cathode and may improve the lithium sulfur battery shelf life as a result. In accordance with various embodiments, the electrolyte may contain an organic surfactant type of additive. In accordance with additional embodiments, the electrolyte of the battery may include inorganic additives, which may further improve shelf life and cycle life performance.

In accordance with further embodiments, a battery may include an anode containing lithium, a cathode containing sulfur, and an electrolyte that is at least partially encased in a separator or a barrier. The separator may be used to isolate electrodes from one or more other electrodes. In accordance with various embodiments, the cathode may further include a carbon material. In accordance with yet additional embodiments, the electrolyte may include organic and inorganic additives.

DETAILED DESCRIPTION OF THE EMBODIMENTS

Lithium-sulfur batteries having improved performance, compared to conventional lithium-sulfur batteries, are described. The lithium-sulfur batteries, and components thereof, may be used in a variety of applications in which primary or secondary batteries are used, such as automotive, transportation, personal safety and security, remote monitoring, law enforcement, utilities and metering, military, and aerospace applications. The batteries may have a higher specific energy, a higher energy density, better discharge performance, and a longer shelf life than traditional lithium-sulfur batteries.

Figure 1:
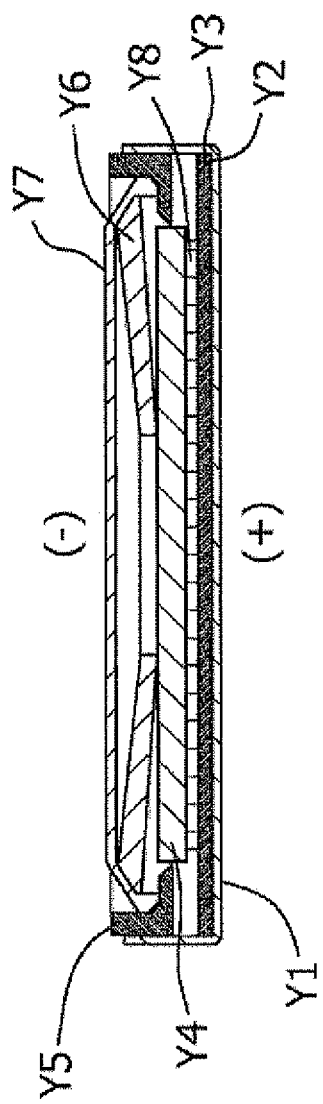
FIG. 1 is a cross-sectional view of a coin cell battery.

FIG. 1 illustrates an exemplary coin cell battery suitable for use herein, which may be used as test vehicle (unless otherwise mentioned) to evaluate the discharge characteristics of a LiS cell that uses the electrolyte as described herein. With reference to FIG. 1, an exemplary test cell includes a cell can Y1, a cathode Y2, a separator Y3, a stainless steel spacer Y4, a gasket Y5, a Belleville spring Y6, a cell cap Y7, an anode Y8, and a non-aqueous electrolyte Y9. The cell may be a rechargeable electrochemical cell. The anode, the cathode, the separator, and the electrolyte may be configured to be contained within the cell can and the cell cap. However, other electrochemical cells according to various embodiments may be of any configuration, such as a cylindrical wound cell, a prismatic cell, a rigid laminar cell, or a flexible pouch, envelope, or bag.

Anode Y8 may include lithium metal and/or one or more lithium alloys, such as lithium aluminum alloys, lithium silicon alloys, and lithium tin alloys. Additional materials suitable for anode Y8 may include Li—C, Li—$Sn_2O_3$, and Li—$SnO_2$ based materials.

An exemplary anode Y8 may include lithium or a lithium alloy. By way of one particular example, anode Y8 includes a lithium foil.

In accordance with various embodiments, cathode Y2 includes sulfur, a binder, and electrical conducting additives, such as carbon black and graphite. The binder may be, for example, polyvinylidene fluoride (PVDF), polyethylene oxide (PEO), or Teflon (PTFE). The cathode may additionally include a substrate, for example an aluminum substrate or a stainless steel mesh, and the sulfur may form a layer or coating over the substrate.

When present, the organic additive in the electrolyte may adsorb on the lithium anode, thus forming a protective layer against sulfur discharge products, such as polysulfides. The resulting protective layer may prevent the continuous transfer of electrons from the anode to polysulfides in solution or on the anode surface during cell rest. Consequently, corrosion of lithium anode may be decreased or stopped. Furthermore, the inorganic additives in the electrolyte, when present, may reduce the loss of sulfur due to self-discharge by chemically converting the self-discharge products, such as polysulfides, back to sulfur during storage. This may further decrease the amount of polysulfides or soluble sulfur species that may otherwise migrate towards the anode. In addition, less passivation due to polysulfides may occur on the surface of lithium anode. Thus, higher performance of the lithium-sulfur battery may be maintained.

The electrolyte may include any material suitable for battery operation. In accordance with various embodiments, the electrolyte is a liquid, solvent-based electrolyte solution. Various electrolytes may be used in connection with the sulfur cathode and the anode. An exemplary electrolyte may comprise a non-aqueous electrolyte solution that includes a solvent system and a salt that is at least partially dissolved in the solvent system. In accordance with embodiments, the electrolyte may comprise 1 M $LiN(CF_3SO_2)_2$ dissolved in an aprotic solvent mixture, such as a 125/25/25/125 by weight of diethylene glycol dimethyl ether, dimethoxyethane, tetraethylene glycol dimethyl ether, and 1,3 dioxolane. Various embodiments may comprise lithium salts, such as, but not limited to, $LiPF_6$, $LiBF_4$, $LiAsF_6$, $LiClO_4$, $LiN(CF_3SO_2)_2$, and $LiB(C_2O_4)_2$. The solvent may comprise an organic solvent, such as polycarbonate, ether, or mixtures thereof. Exemplary electrolyte salts used with further anode materials may comprise the same cations as the anode metal combined with anions, such as those noted herein.

Exemplary electrolyte materials may include 1 M $LiN(CF_3SO_2)_2$ dissolved in an aprotic solvent mixture, such as, for example, a 125/25/25/125 by weight of diethylene glycol dimethylether, dimethoxyethane, tetraethylene glycol dimethyl ether, and 1,3 dioxolane. During a discharge operation of the battery, lithium anode Y8 may be oxidized to form lithium ions, while the sulfur cathode may be reduced to form polysulfides, which are soluble products. During a charging operation, polysulfides may be oxidized to form solid sulfur, while the lithium ions may be plated back to the anode.

In the absence of organic and/or inorganic additives in the electrolyte, lithium-sulfur batteries may have a low discharge performance, which may be due to the self-discharge of the sulfur cathode resulting in polysulfides diffusing away from the cathode and, thus, lithium anode passivation. The addition of additives comprising an oxidant, such as lithium nitrate, lithium perchlorate, and the like, and a catalyst, such as lithium iodide, may lead to an amount of polysulfide outflow from the cathode being chemically oxidized back to sulfur during storage. As mentioned above, the LiS battery, when built with an electrolyte containing organic additives, such as fluorosurfactants, may exhibit longer shelf life and better cycle life. The fluorosurfactant additive within the electrolyte may form a protective layer on the lithium anode and may shield it against polysulfide species.

An organic additive type of surfactant for use with the electrolyte may be selected based on an intended application, because the addition of surfactants might alter the operating voltage of the battery. In addition, an amount of surfactant in the electrolyte may be selected according to the desired battery properties. In accordance with various embodiments, the fluorosurfactant additive type is provided in the electrolyte at a concentration of 0.0005% to about 5% relative to the weight of the electrolyte, such as between about 0.01% and about 1%, or between about 0.1% and about 0.5%. In the stated ranges, the fluorosurfactant may maintain desirable electrolyte characteristics, as described herein. In the stated ranges, the fluorosurfactant may effectively protect the anode against polysulfides while also improving the discharge performance. The fluorosurfactant type additive may also increase the electrolyte stability in the anodic potential range. Examples of suitable fluorosurfactants for use as organic additives include acrylate polymers with pendant glycol and/or perfluoroalkyl sulfonate groups. Specific examples of the suitable fluorosurfactants are disclosed, for example, in U.S. Pat. No. 8,057,859 B2 (Kaplan et al.), which is incorporated by reference in its entirety. Such fluorosurfactants may be of the following general Formula I:

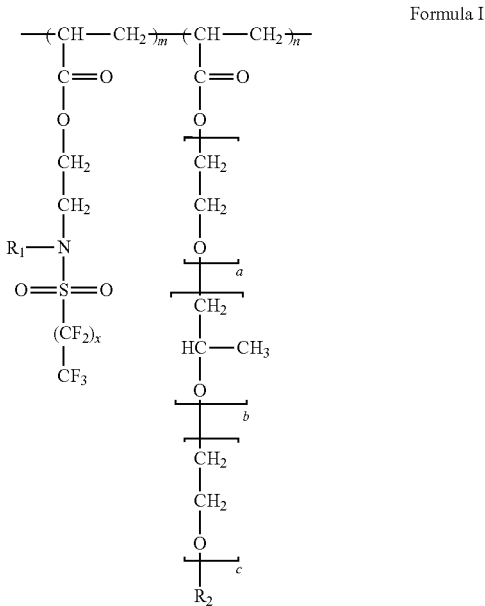

Formula I

In Formula I, $m/(m+n)$ is from 0 to about 1, for example, from about 0.2 to about 0.8 or from about 0.5 to about 0.6; $R_1$ is hydrogen or an alkyl group having from about 1 to about 18 carbons, for example, from about 1 to about 10 carbons; and $R_2$ is hydrogen, an alkyl group having from about 1 to about 18 carbons, for example, from about 1 to about 10 carbons, or a connection point to an acrylate polymer backbone, thus creating an inter- or intra-molecular bridge; x is a number from about 1 to about 10, for example, from about 1 to about 5 or, for example, about 3; a is a number from about 1 to about 50, for example, from about 1 to about 30 or from about 5 to about 20; b is a number from about 1 to about 100, for example, from about 5 to about 50 or from about 10 to about 30; and c is a number from about 1 to about 50, for example, from about 1 to about 30 or from about 5 to about 20. Examples of commercially available fluorine-containing surfactants falling within the above Formula I include Novec FC-4430 and Novec FC-4432, both of which are commercial products sold by 3M. For these particular surfactants: $R_1$=$CH_3$, x-3, a is about 10, b is about 20, and c is about 10. For Novec FC-4430, $m/(m+n)$ is about 0.5 and, for Novec™. FC-4432, $m/(m+n)$ is about 0.6.

Unexpected and advantageous benefits may be recognized when the above-mentioned fluorosurfactant type of additive is used in combination with lithium salts, such as lithium nitrate and/or lithium iodide, that can be added into the electrolyte in the concentration ranging from about 0.02M to about 0.5M, for example, from about 0.1M to about 0.4M, or from about 0.2M to about 0.3M. For example, the LiS battery shelf life and charge-discharge efficiency may be improved.

The charge-discharge efficiency may be, for example, in the range of about 89% to about 100% for 50 cycles. The initial discharge capacity may be about 890 mAh/g and the capacity may remain at about 750 mAh/g for about 19 cycles at C/8 rate. When discharged at C/30 rate, the cell delivers an initial capacity of about 1014 mAh/g and remains at about 800 mAh/g for 9 cycles and above about 750 mAh/g for 30 cycles. The initial capacity and the number of cycles achievable with consistent capacity depend on the electrode quality.

Other advantages may include controlled sulfur self-discharge, the lithium anode being protected against polysulfides, and improved cell discharge performance in a non-aqueous electrochemical cell that includes a fluorosurfactant, lithium nitrate, and lithium iodide in the electrolyte.

EXAMPLES

These and other aspects of this invention are not intended to define the scope of the invention for which purpose claims are provided. In the following description, reference is made to accompanying drawings, which form a part hereof and in which there is shown by way of illustration, and not limitation, an embodiment of the invention. Such embodiment does not define the scope of the invention and reference must be made therefore to the claims for this purpose.

Electrochemical Evaluation

Electrochemical behavior of the LiS cell built with an electrolyte including a fluorosurfactant was evaluated in a pouch cell using lithium metal as an anode. The cathode consisted of 47.6% sulfur as an active material, 32.4% carbon black and 12% KS4 (graphite) as conductive fillers, and 8% polyvinylidene fluoride (PVDF) as a binder. Sulfur, carbon black, and graphite were first mixed through ball milling. Then, the resulting dry mix was added to PVDF dissolved in N-methyl-2-pyrrolidone (NMP) solution to form a slurry. Finally, the slurry was applied to a carbon-coated aluminum foil substrate to form a cathode, using an electrode coater equipped with an oven to evaporate the NMP. This cathode formulation was used in Comparative Example 1 and in Examples 1-3. The resulting cathode was evaluated in pouch cells using lithium foil and polypropylene as the anode and separator, respectively. Both the cathode and the anode had similar geometrical surface areas of 28.54 cm$^2$. The sulfur content in the electrode was 0.114 g, which is equivalent to 190 mAh. The resulting pouch cells were discharged after 15 hours of rest at room temperature.

Comparative Example 1

Figure 2:
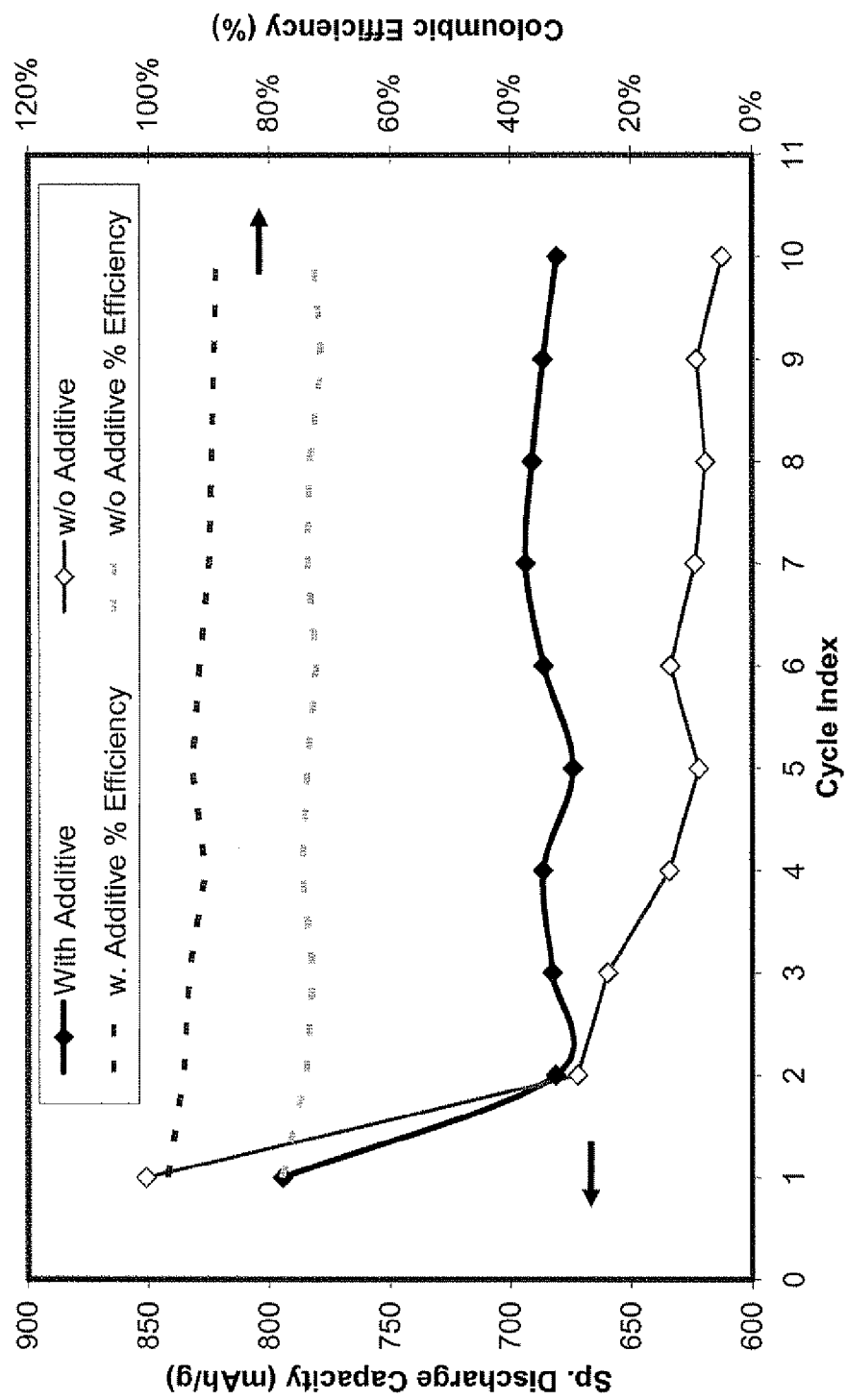
FIG. 2 is a graphical representation of the discharge capacity and Coulombic efficiency, with respect to cycle index, of Comparative Example 1 and Example 1.

An electrolyte was made by dissolving 1M solution of lithium bis(trifluoromethanesulfonyl)imide (1 M LiN$(CF_3SO_2)_2$, LiTFSI) in 1,3 dioxolane/diglyme 50/50 by volume. The Li—S pouch cells were discharged from OCV to 1.5 V at a rate of C/8 and allowed to rest for 10 minutes. Following that they were charged to 2.7 V or to a specific cut off capacity, whichever condition was satisfied first. The capacity cut off for charging is given in the following equation:

$$\text{Charge capacity}(n+1) = 1.25 * \text{Discharge Capacity}(n),$$

where n is the cycle index. Over charging and polysulfide sulfide shuttling were effectively controlled by this test procedure. The Coulombic efficiency was calculated by the ratio of discharge capacity (n+1)/charge capacity (n), where n is the cycle index. Due to the above procedure, the percentage efficiency showed minimal variation. In particular, the efficiency varied from 77.9% for the first cycle to 72.7% for the 10$^{th}$ cycle. However, the discharge capacity decreased from 851 mAh/g for the first discharge, to 660 mAh/g for the third discharge, and to 612 mAh/g for the 10$^{th}$ discharge, as illustrated in FIG. 2.

Example 1

An electrolyte was made by dissolving 1% (weight %) fluorosurfactant FC4432 and 1M LiTFSI in an aprotic solvent mixture of 50/40/10 1,3 dioxolane/diglyme/tetraglyme by volume. The Li—S pouch cell was cycled at a rate of C/8 following the test procedure described in Comparative Example 1, but without the capacity cut off for charging. The reason for eliminating the cut off in the test procedure relates to the anode protection ability of the surfactant, which decreases polysulfide shuttling and, thereby, overcharging. The efficiency varied from 97% for the 1st cycle to 89% for the 10th cycle. However, the discharge capacity decreased from 794 mAh/g for the first discharge, to 683 mAh/g for the third discharge, and stayed above 681 mAh/g for 10 cycles. For the first discharge, the capacity of the Li—S cell with the electrolyte of Comparative Example 1 was about 50 mAh/g higher than the capacity of the Li—S cell with the electrolyte of Example 1. However, for the 10$^{th}$ cycle, the capacity of the Li—S cell with the electrolyte of Example 1 was about 88 mAh/g higher than the capacity of the Li—S cell with the electrolyte of Comparative Example 1 (See FIG. 2).

Example 2

Figure 3A:
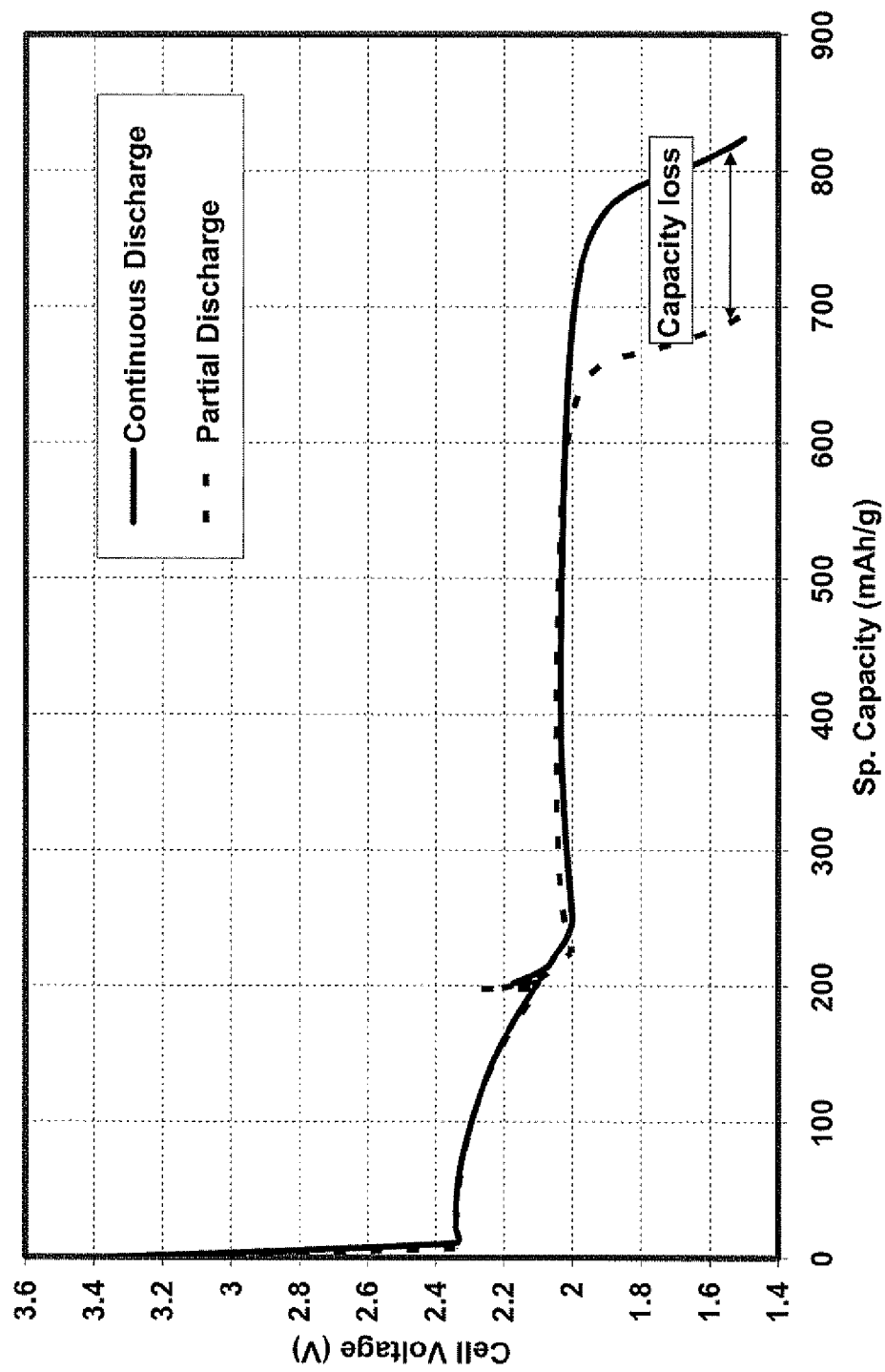
FIG. 3a is a graphical representation of the capacity loss for cells having the electrolyte of Comparative Example 1.
Figure 3B:
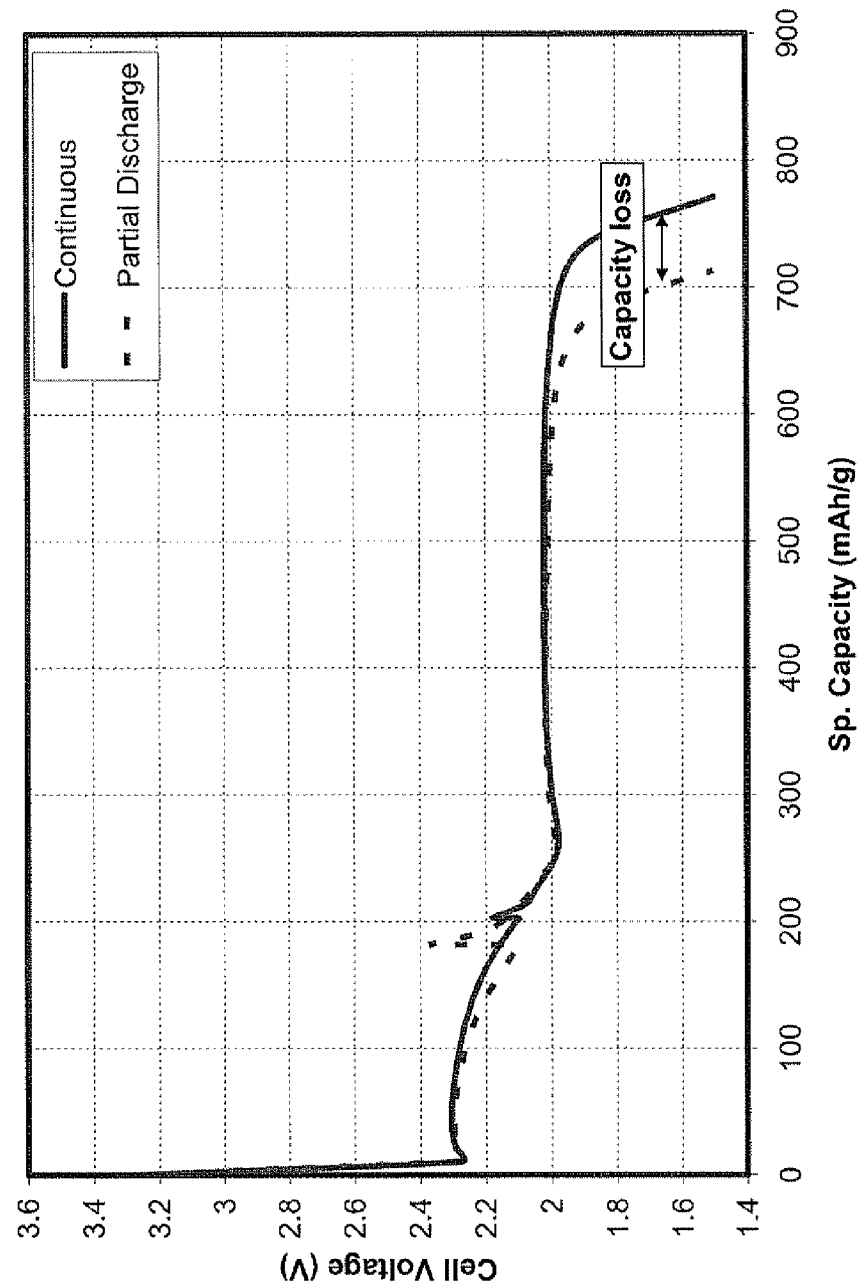
FIG. 3b is a graphical representation of the capacity loss for cells having the electrolyte of Example 1.

Li—S pouch cells were made with the electrolyte of Comparative Example 1 and that of Example 1, respectively. For the partial discharge, the cells were discharged from OCV down to 2.1 V and stored at room temperature for 3 days. The cell OCV was monitored during storage. After 3 days of rest, the cell was further discharged down to 1.5 V. The capacity loss, which is expressed in terms of capacity difference between continuous and partial discharge, was compared for cells made with each of the above described electrolytes. The loss in discharge capacities of cells with the electrolyte from Comparative Example 1 was 17%, as opposed to the loss in discharge capacities of cells with the electrolyte of Example 1, which was only 7.5%, as shown in FIGS. 3a and 3b.

Example 3

Figure 4A:
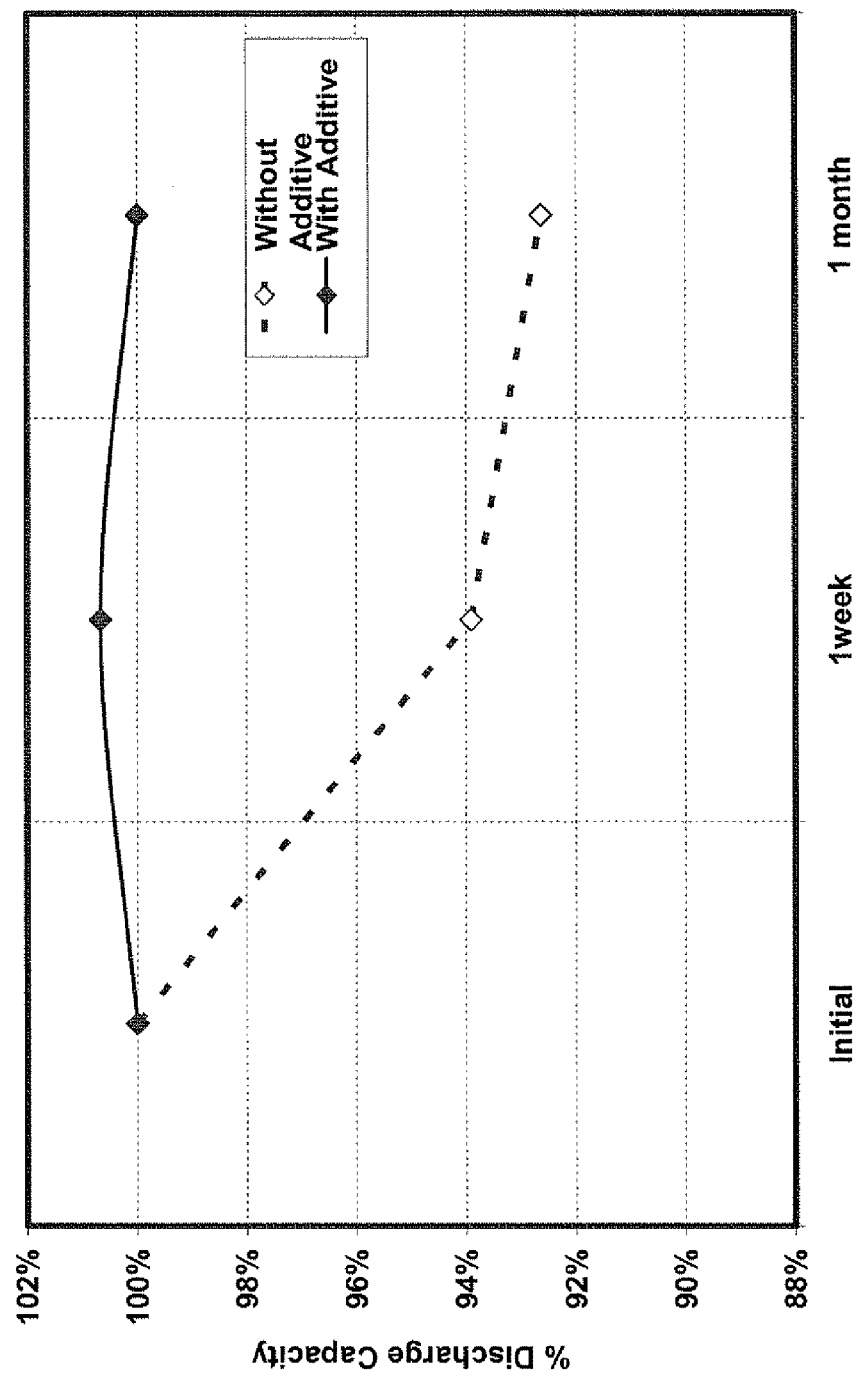
FIG. 4a is a graphical representation of the effect of the electrolyte on the shelf life of Li—S Pouch Cell.
Figure 4B:
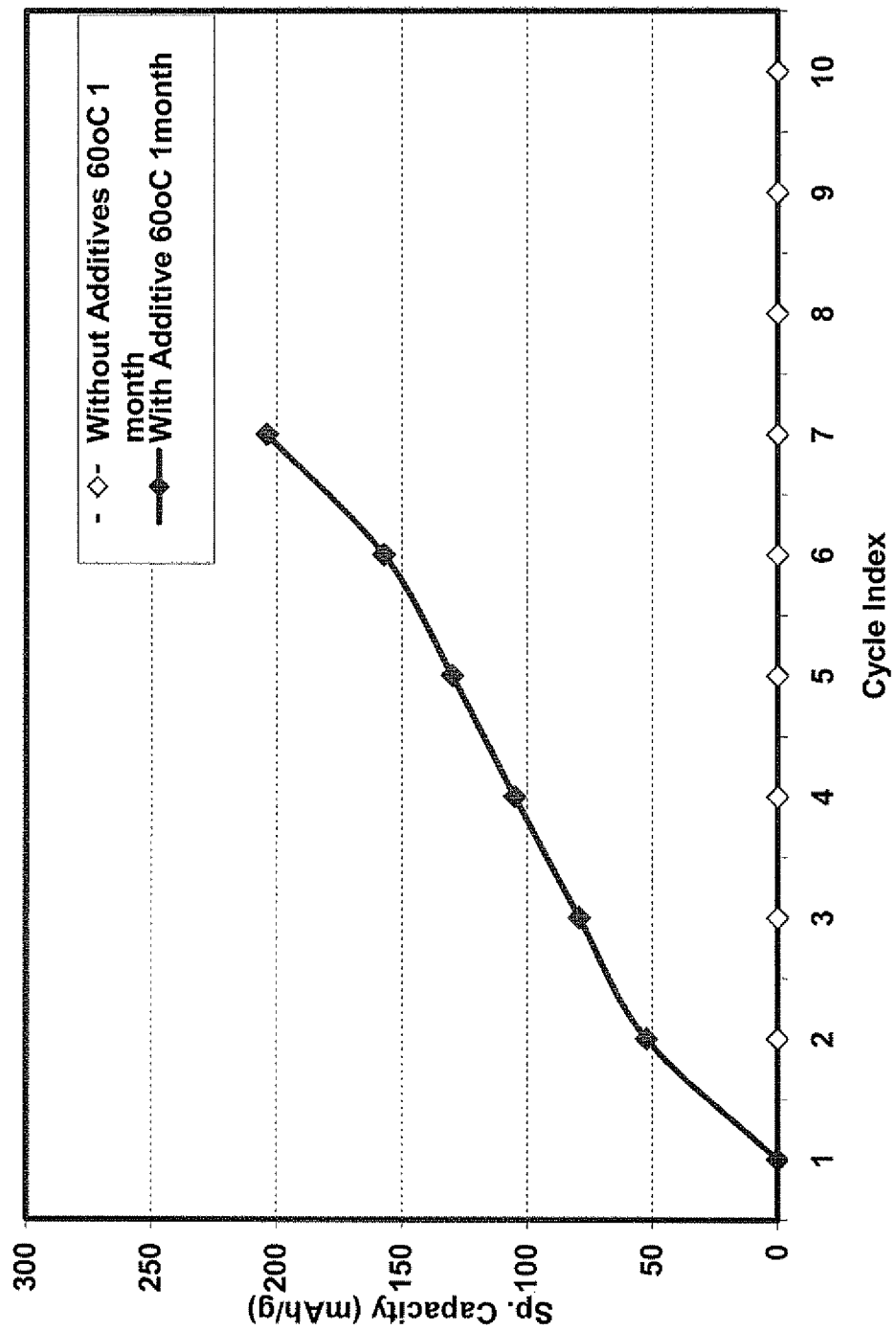
FIG. 4b is a graphical representation of the recovery of discharge capacity of a cell with the electrolyte of Example 1 versus that of Comparative Example 1.

Li—S pouch cells with the electrolyte of Example 1 and the electrolyte of Comparative Example 1 were stored both at room temperature and at high temperature (60° C.) for a period of 1 month. Their performances were investigated as a function of storage time. The discharge performance of the investigated cells is illustrated in FIG. 4a. As shown in FIG. 4a, the cells built with the electrolyte from Example 1 showed very good shelf life with no capacity loss. However, the cells built with electrolyte without the surfactant additive, i.e. the cells with the electrolyte of Comparative Example 1, showed 8% loss in discharge capacity after 1 month of storage at room temperature. When the cells were stored at 60° C. for 1 month, both the cells of Example 1 and of Comparative Example 1 showed a loss in initial discharge capacity. However the cells with electrolyte of Example 1 recovered with multiple charge-discharge cycle, whereas cells with electrolyte from Comparative Example 1 could not be further discharged, as shown in FIG. 4b.

Example 4

Figure 5:
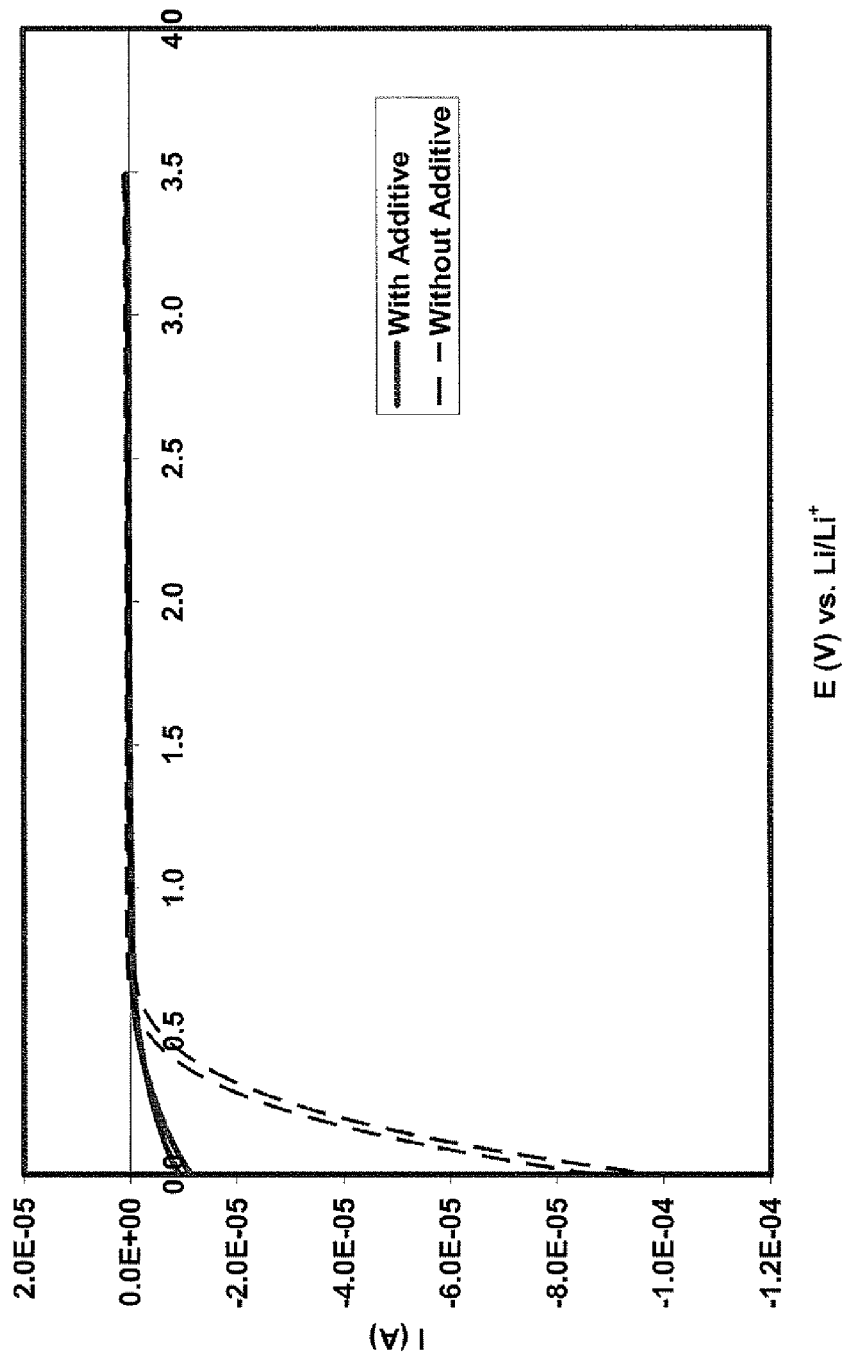
FIG. 5 is a graphical representation of the cyclic voltammograms of the electrolytes of Comparative Example 1 and Example 1.

FIG. 5 shows cyclic voltammograms of the electrolytes of Comparative Example 1 and of Example 1, respectively. As shown in FIG. 5, the electrolyte of Comparative Example 1 had a strong reduction peak below 0.5 V compared to the electrolyte of Example 1. The reduction of the electrolyte of Comparative Example 1 was minimized by an order of 10 by the addition of the surfactant. Thus, the addition of the fluorosurfactant resulted in 10 times higher stability of the electrolyte.

Example 5

Figure 6A:
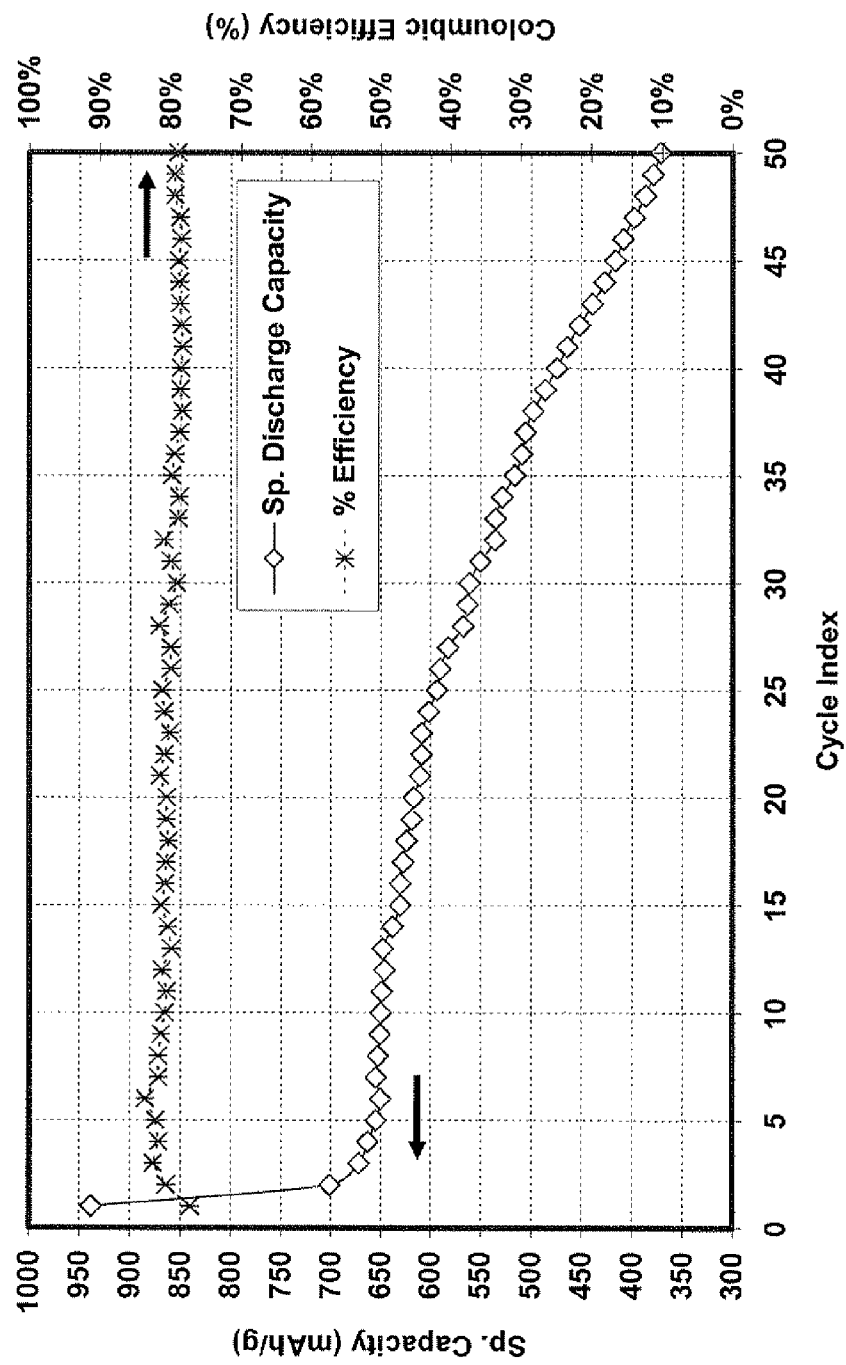
FIG. 6a is a graphical representation of the Li—S pouch cell made with an improved electrode structure containing the electrolyte of Comparative Example 1.

FIG. 6a shows the Li—S pouch cell made with an improved electrode structure containing the electrolyte of Comparative Example 1. The test procedure was similar to that of Comparative Example 1. The discharge capacity varied from 938 mAh/g for the first discharge, to 672 mAh/g for the third discharge, and 372 mAh/g for the 50$^{th}$ discharge. The Coulombic discharge efficiency was about 80%, as shown in FIG. 6a.

Example 6

Figure 6B:
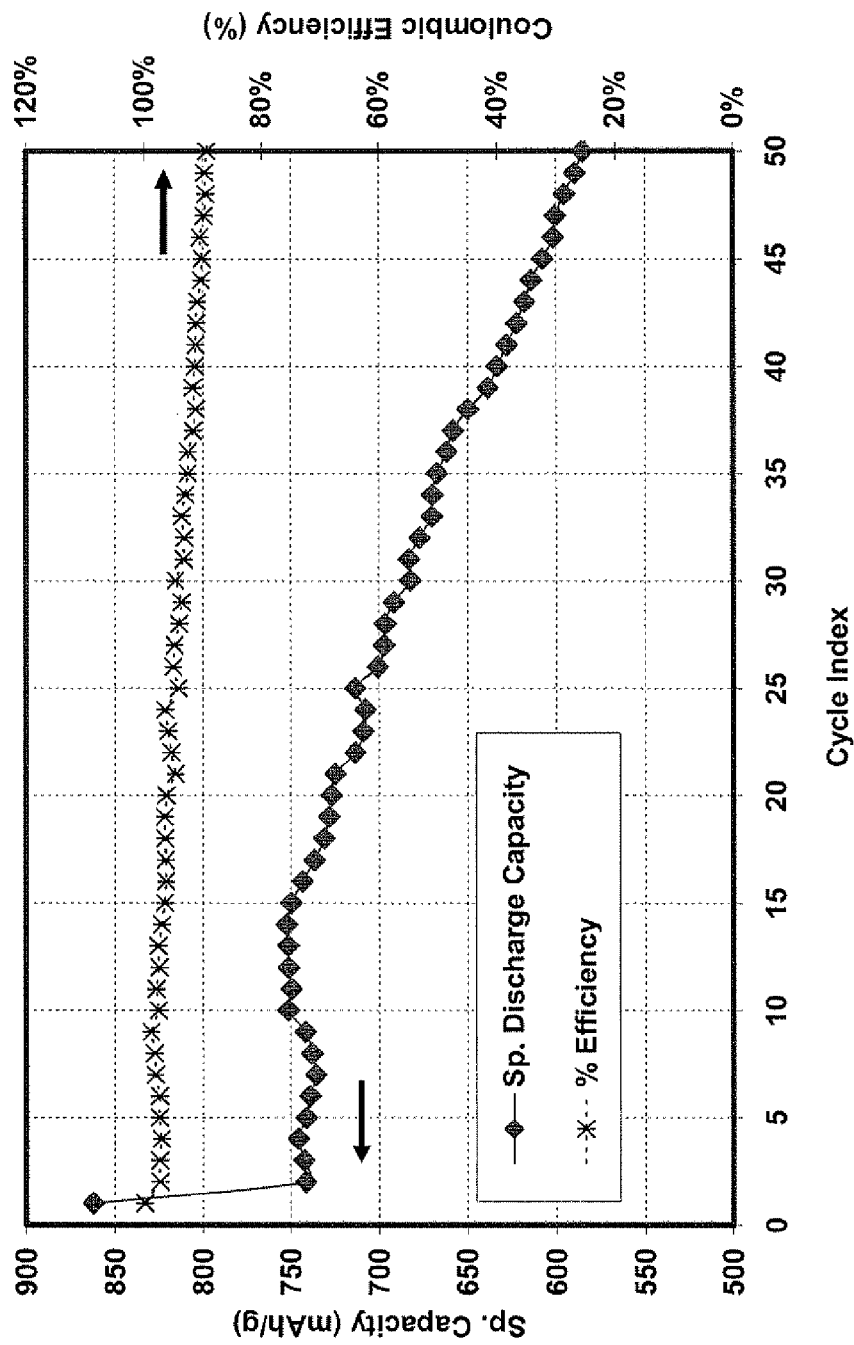
FIG. 6b is a graphical representation of the discharge performance of the Li—S pouch cells made with the electrode of Example 5.

FIG. 6b shows the discharge performance of the Li—S pouch cells made with the improved electrode of Example 5 further containing 0.05M LiI and 0.05M LiNO$_3$ added to the electrolyte of Example 1. The test procedure was similar to that of Comparative Example 1, but without the capacity cut off for charging. The efficiency varied from 100% for the 1st cycle to 89% for the 50th cycle. The discharge capacity was 862 mAh/g for the first discharge, 746 mAh/g for the third discharge, and stayed above 700 mAh/g for 25 cycles. At the 50th cycle, the discharge capacity was 585 mAh/g, which is 200 mAh/g higher than the capacity observed for the Li—S cell built with the electrolyte from Comparative Example 1.

Example 7

Figure 7:
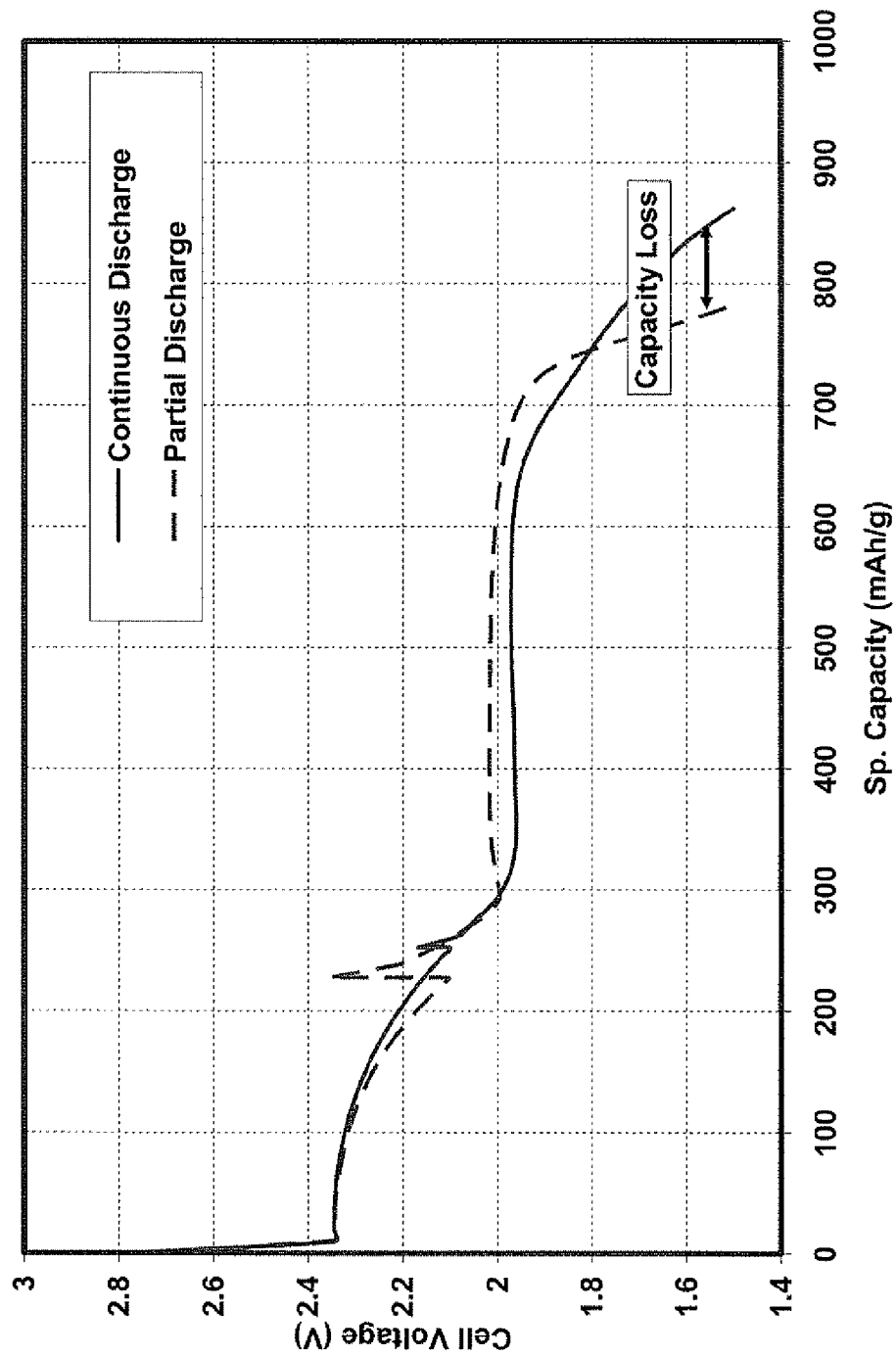
FIG. 7 is a graphical representation of the partial discharge performance of the Li—S pouch cell built with the improved electrode of Example 5 containing the electrolyte of Example 6.

FIG. 7 shows the partial discharge performance of the Li—S pouch cell built with the improved electrode of Example 5 containing the electrolyte of Example 6. The test procedure was similar to that previously described in Example 2. As shown in FIG. 7, the cell built with the electrolyte of Example 6 had about 9% loss in capacity, while the cell with the electrolyte of Comparative Example 1 was about 15%.

Example 8

Figure 8:
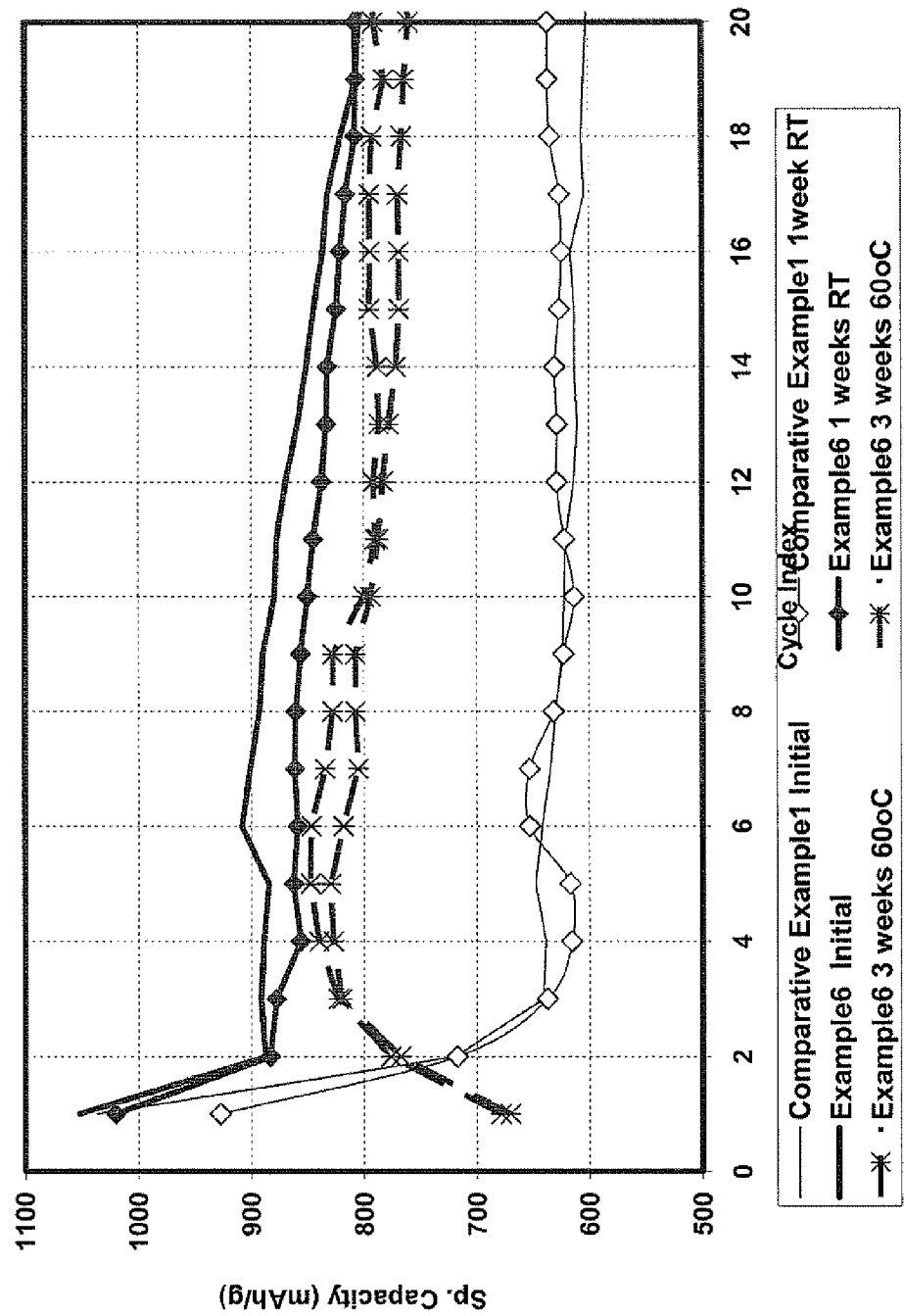
FIG. 8 is a graphical representation of the discharge performance of cells after being stored at a temperature of 60° C. for up to a period of 3 weeks.

FIG. 8 shows the discharge performance of the cells after being stored at a temperature of 60° C. for up to a period of 3 weeks. The Li—S cells were built with the electrolyte of Example 6 and with the improved electrode, as described in Example 5. Cells made with the electrolyte of Comparative Example 1 were provided for comparison. The cells were tested following the procedure described in Comparative Example 1, but at a lower rate of C/30. The cells with the electrolyte of Example 6 stored at 60° C. for 3 weeks showed 22% capacity loss for the first discharge. However, the cells recovered and showed a good cycle life performance with 2% capacity loss compared to the cycle life capacity of fresh cells before storage. For the same conditions of storage, the cells with the electrolyte of Comparative Example 1 were not able to discharge.

Example 9

Figure 9A:
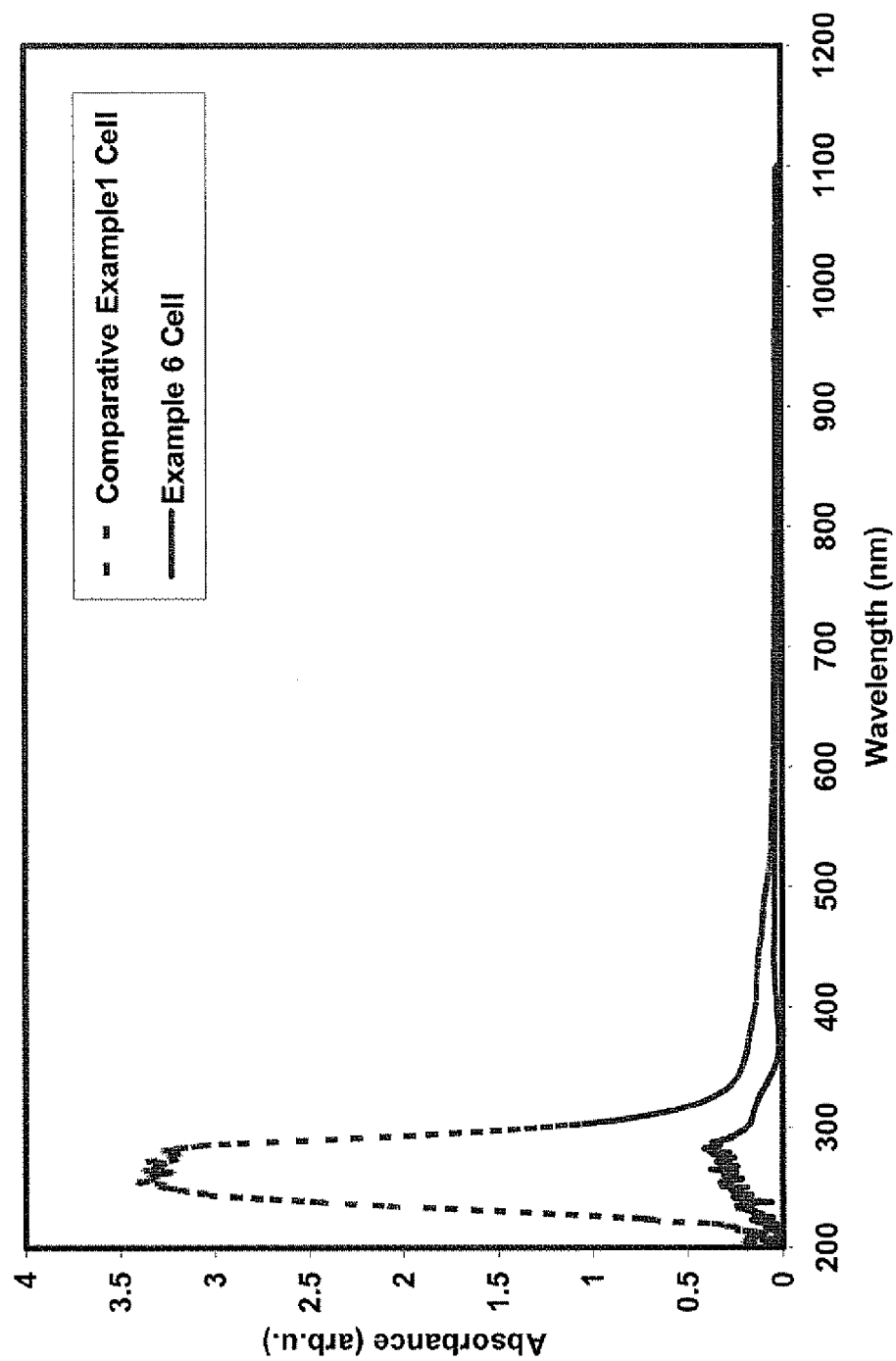
FIG. 9a is a graphical representation of the background corrected UV-visible spectra of electrolyte samples taken from cells after being stored at a temperature of 60° C. for up to a period of 3 weeks.

FIG. 9a shows the background corrected UV-visible spectra of electrolyte samples taken from cells after being stored at a temperature of 60° C. for up to a period of 3 weeks. The Li—S cells were built with the improved electrode of Example 5. One cell contained the electrolyte of Example 6 and the other cell contained the electrolyte of Comparative Example 1. The UV-visible spectra of the electrolyte show higher polysulfide concentration in the cell made with the electrolyte of Comparative Example 1 and lower polysulfide concentration in the cell containing electrolyte of Example 6. The polysulfide concentration is directly proportional to the area under the peak.

Figure 9B:
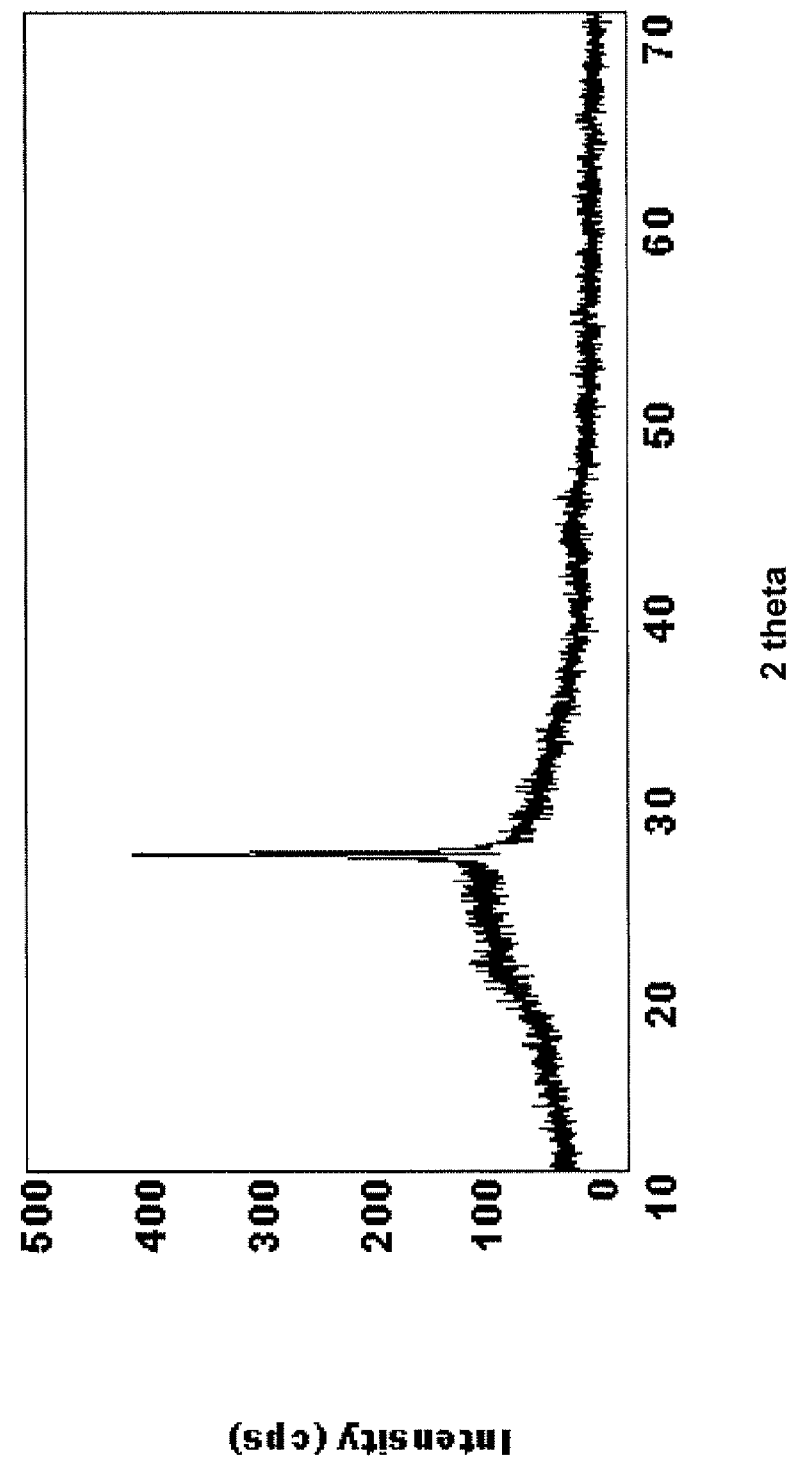
FIG. 9b is a graphical representation of the X-ray diffraction analysis of the cathode from a 60° C. stored cell made with the electrolyte of Example 6.
Figure 9C:
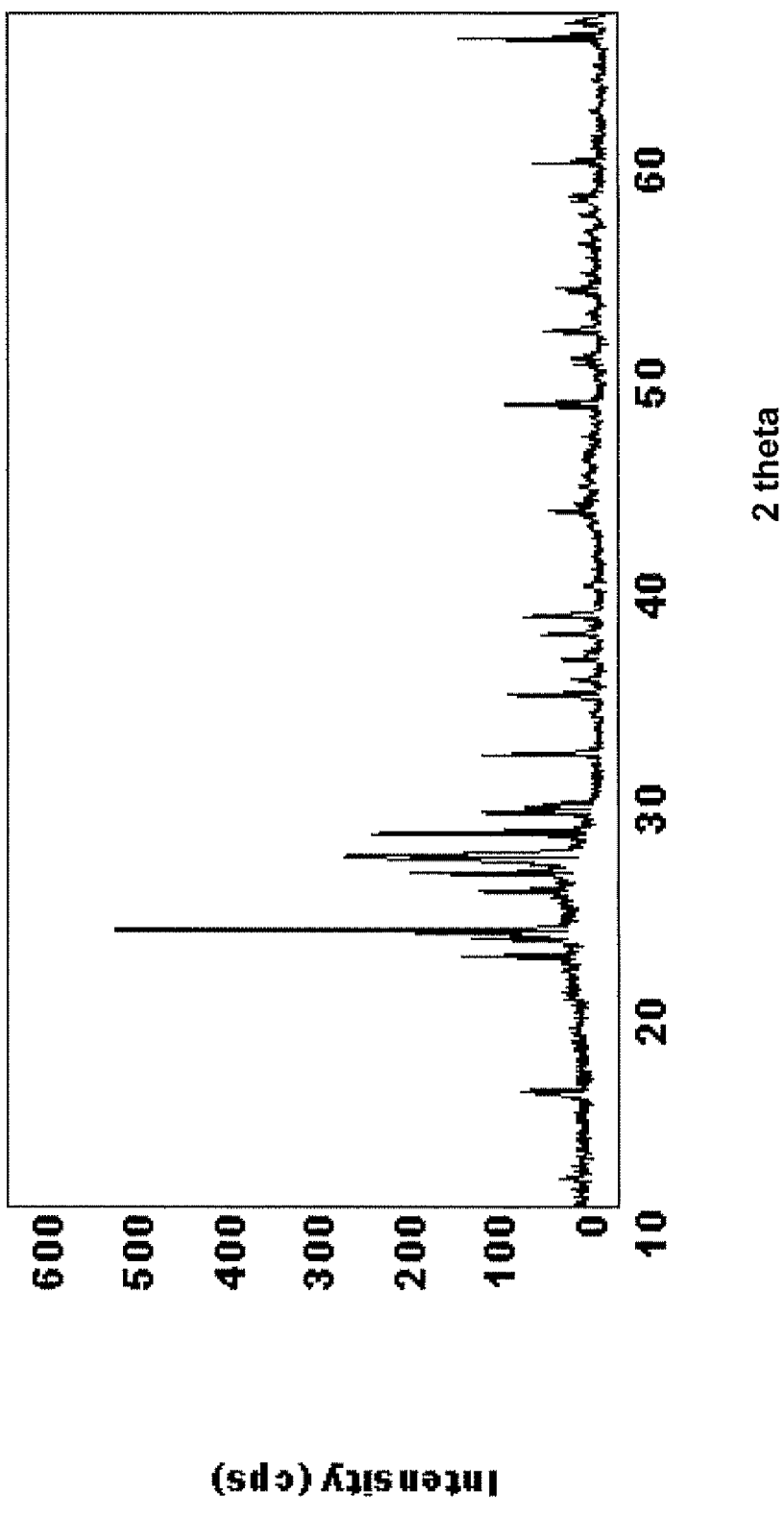
FIG. 9c is a graphical representation of the X-ray diffraction analysis of the cathode from a 60° C. stored cell made with the electrolyte of Comparative Example 1.

Furthermore, the X-ray diffraction analysis of the cathodes from each of these two cells show presence of a sulfur peak in the cell made with the electrolyte of Example 6 (FIG. 9b) and mostly a carbon and $Li_2S$ peak in the cell made with the electrolyte of Comparative Example 1 (FIG. 9c). These results show the effect of the additives in the electrolyte of Example 6 for minimizing the Li—S self discharge into polysulfides, which leads to low polysulfide concentration in the electrolyte and retention of sulfur on the cathode. In cells made with the electrolyte of Comparative Example 1, sulfur self discharge occurs and leads to higher polysulfide concentration in the electrolyte, loss of sulfur in the cathode, and the presence of final discharge product $Li_2S$ on the cathode surface.

Example 10

Figure 10:
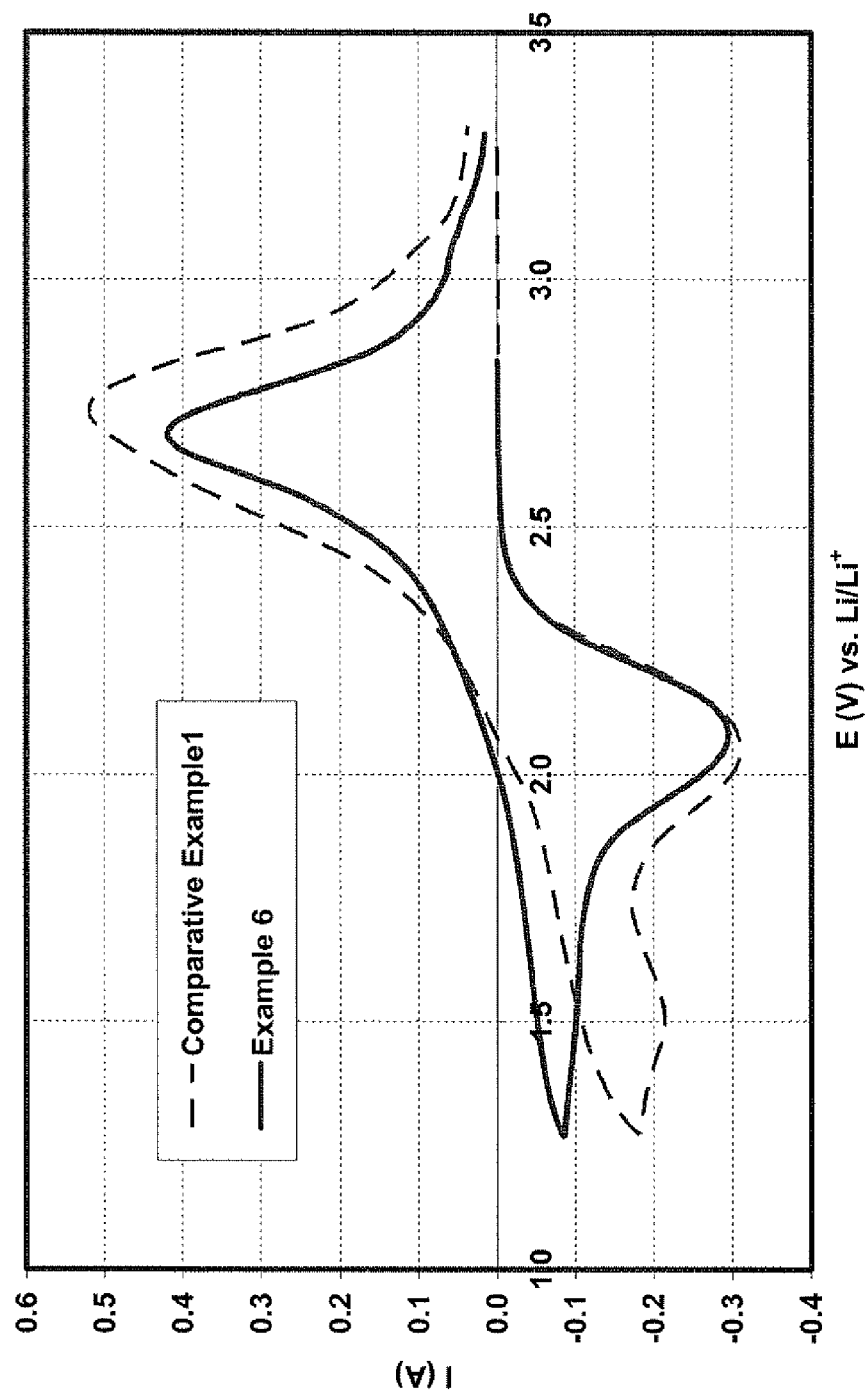
FIG. 10 is a graphical representation of the cyclic voltammograms of the electrolyte of Comparative Example 1 and the electrolyte of Example 6.

FIG. 10 shows cyclic voltammograms of the electrolyte of Comparative Example 1 and the electrolyte of Example 6. The test vehicle was a pouch cell, with the cathode of Example 5 and a lithium anode separated by a Celgard separator. As shown in FIG. 10, the electrolyte of Comparative Example 1 had a strong reduction peak below 1.75 volts compared to the electrolyte of Example 6. The cell built with the electrolyte from Example 6 had a flat plateau, i.e., no reduction peak, in the same testing conditions. It is well known that lithium nitrate has a reduction peak at about 1.6 volts. However, in the electrolyte of Example 6, which contains the fluorosurfactant, lithium iodide, and lithium nitrate, this reduction was no observed. This result may suggest that the surfactant shifts the reduction potential of lithium nitrate below the cut off voltage of 1.5 V. Therefore, the activity of both the $LiNO_3$ and LiI additives in the electrolyte may be preserved in the operative voltage window of the cell (3.3 V to 1.5 V). Thus, a LiS battery using this electrolyte may have an improved cycle life performance.

Example 11

Figure 11:
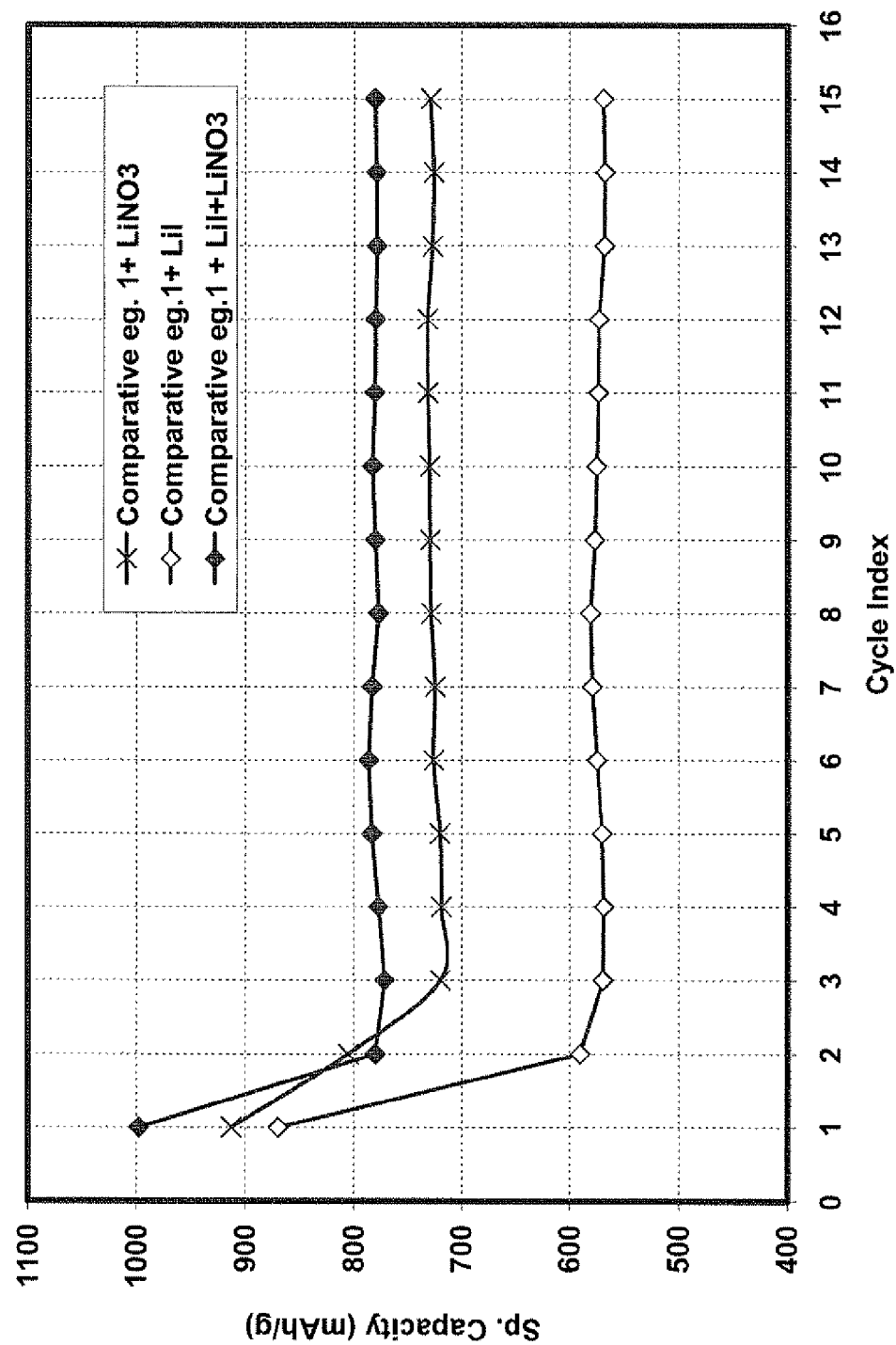
FIG. 11 is a graphical representation of the discharge performance of the Li—S pouch cells of Comparative Example 1 built with three different electrolytes.

Lithium nitrate, lithium iodide, or a mixture of both salts was added to the electrolyte of Comparative Example 1 to form three different electrolytes, respectively. The lithium salt molar concentration in the resulting electrolytes was the same and equal to 0.05 M for the $LiNO_3$, LiI, or LiI and $LiNO_3$ mixture based electrolytes. FIG. 11 shows the discharge performance of the Li—S pouch cells built with these electrolytes. As shown in FIG. 11, the cells built with an electrolyte containing either $LiNO_3$ or LiI delivered a first discharge capacity of 912 and 869 mAh/g, respectively. In comparison, the cells built with electrolytes containing both $LiNO_3$ and LiI exhibited the highest first discharge capacity of 998 mAh/gm. After 14 cycles, the discharge capacities were 726 mAh/g for $LiNO_3$ electrolyte based cells, while that of LiI electrolyte based cells was 567 mAh/g. Cells built with electrolytes containing both $LiNO_3$ and LiI exhibited an improved capacity retention and offered 779 mAh/gm after 14 cycles. These results may show that the mixture of LiI and $LiNO_3$ in the electrolyte is critical to achieve a higher discharge efficiency and better cycle life. Lithium nitrate may oxidize the LiI to iodine, which catalytically converts polysulfides to sulfur during charging or storage. The reduction of lithium nitrate by the anode may have been further suppressed in the presence of surfactant, as in example 10, thereby increasing the discharge capacity and cycle life.

What is claimed is:

1. A battery comprising:
   an anode containing a lithium material;
   a cathode containing sulfur and a porous conducting medium;
   an electrolyte containing:
      a fluorosurfactant;
      a combination of salts that act as an oxidant and a catalyst added to the electrolyte in a concentration ranging from about 0.02 M to 0.4 M; and
   a protective layer on the anode, wherein a composition of the protective layer is the same composition of the fluorosurfactant.

2. The battery of claim 1, wherein the fluorosurfactant is provided in the electrolyte at a concentration of about 0.0005% to about 5% by weight, relative to a weight of the electrolyte.

3. The battery of claim 1, wherein the fluorosurfactant comprises acrylate polymers having pendant glycol groups and/or perfluoroalkyl sulfonate groups.

4. The battery of claim 1, wherein the fluorosurfactant is represented by Formula I:

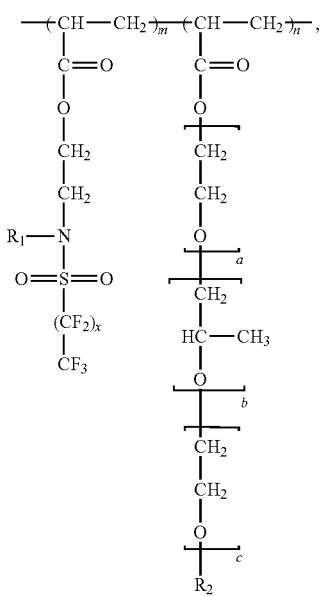

Formula 1 wherein:
  m/(m+n) is from about 0 to about 1;
  $R_1$ is hydrogen or an alkyl group having from about 1 to about 18 carbon atoms;
  $R_2$ is hydrogen, an alkyl group having from about 1 to about 18 carbon atoms, or a connection point to an acrylate polymer backbone;
  x is a number from about 1 to about 10;
  a is a number from about 1 to about 50;
  b is a number from about 1 to about 100; and
  c is a number from about 1 to about 50.

5. The battery of claim 1, wherein the lithium material is selected from the group consisting of lithium metal, lithium alloys, Li—C based materials, Li—$Sn_2O_3$ based materials, Li—$SnO_2$ based materials, and a lithium foil.

6. The battery of claim 1, wherein the cathode further comprises an electronic conductive additive.

7. The battery of claim 6, wherein the electronic conducting additive is carbon black, graphite, or a mixture thereof.

8. The battery of claim 1, wherein the cathode further comprises at least one of a substrate and a binder.

9. The battery of claim 8, wherein the cathode comprises a polyvinylidene fluoride binder.

10. The battery of claim 1, wherein the electrolyte is a solvent-based electrolyte solution.

11. The battery of claim 10, wherein the electrolyte comprises a non-aqueous electrolyte solution, and the non-aqueous electrolyte solution contains a solvent system and a salt at least partially dissolved in the solvent system.

12. The battery of claim 11, wherein the salt is selected from the group consisting of lithium nitrate, lithium iodide, $LiPF_6$, $LiBF_4$, $LiAsF_6$, $LiClO_4$, $Li(CF_3SO_3)$, $LiN(CF_3SO_2)_2$, and $LiB(C_2O_4)_2$.

13. The battery of claim 12, wherein the salt is 1M $LiN(CF_3SO_2)_2$, and the solvent system is an aprotic solvent mixture.

14. The battery of claim 1, wherein the battery has a charge-discharge efficiency in the range of about 89% to about 100% for 50 cycles.

15. The battery of claim 1, wherein the electrolyte is at least partially encased in a separator or in a barrier.

16. A battery comprising:
  an anode containing a lithium material;
  a cathode containing sulfur, a porous conducting medium, and an electrical conducting additive
  an electrolyte comprising:
    a fluorosurfactant; and
    a combination of salts that act as an oxidant and a catalyst added to the electrolyte in a concentration ranging from about 0.02 M to 0.4 M; and
  a protective layer on the anode, wherein a composition of the protective layer is the same as a composition of the fluorosurfactant.

17. The battery of claim 16, wherein the electrical conductive additive is carbon black or graphite.

18. The battery of claim 1, wherein the salt that acts like an oxidant is selected from the group consisting of lithium nitrate and lithium perchlorate.

19. The battery of claim 1, wherein the salt that acts like a catalyst is lithium iodide.

* * * * *